(12) United States Patent
Choi et al.

(10) Patent No.: US 8,134,535 B2
(45) Date of Patent: Mar. 13, 2012

(54) DISPLAY DEVICE INCLUDING INTEGRATED TOUCH SENSORS

(75) Inventors: Jin-Young Choi, Seoul (KR); Hyung-Guel Kim, Yongin-si (KR); Kee-Han Uh, Yongin-si (KR); Jin Jeon, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 818 days.

(21) Appl. No.: 11/952,338

(22) Filed: Dec. 7, 2007

(65) Prior Publication Data
US 2009/0002336 A1  Jan. 1, 2009

(30) Foreign Application Priority Data
Mar. 2, 2007 (KR) .................. 10-2007-0020983

(51) Int. Cl.
*G09G 5/00* (2006.01)

(52) U.S. Cl. .................. 345/173; 345/174; 178/18.01; 178/18.06

(58) Field of Classification Search .......... 345/173–179, 345/98–100; 178/18.01, 18.03, 18.05–18.07
See application file for complete search history.

(56) References Cited

U.S. PATENT DOCUMENTS

| | | | |
|---|---|---|---|
| 5,831,600 A * | 11/1998 | Inoue et al. ............... | 345/173 |
| 5,847,690 A | 12/1998 | Boie et al. | |
| 6,633,279 B1 | 10/2003 | Kono et al. | |
| 2004/0150629 A1 * | 8/2004 | Lee ............... | 345/173 |
| 2004/0217945 A1 | 11/2004 | Miyamoto et al. | |
| 2006/0017710 A1 * | 1/2006 | Lee et al. ............... | 345/173 |
| 2006/0109222 A1 * | 5/2006 | Lee et al. ............... | 345/88 |
| 2006/0132463 A1 * | 6/2006 | Lee et al. ............... | 345/173 |
| 2006/0201931 A1 * | 9/2006 | Lee et al. ............... | 219/497 |
| 2006/0220077 A1 | 10/2006 | Hayashi et al. | |
| 2007/0030221 A1 * | 2/2007 | Pak et al. ............... | 345/87 |
| 2007/0040814 A1 * | 2/2007 | Lee et al. ............... | 345/173 |

FOREIGN PATENT DOCUMENTS

| | | |
|---|---|---|
| CN | 1800923 | 7/2006 |
| JP | 10-049301 | 2/1998 |
| JP | 10-198515 | 7/1998 |
| JP | 2000-099268 | 4/2000 |

(Continued)

*Primary Examiner* — Amare Mengistu
*Assistant Examiner* — Hong Zhou
(74) *Attorney, Agent, or Firm* — F. Chau & Associates, LLC

(57) ABSTRACT

A display device including a plurality of sensing units, a plurality of first sensing signal lines, a first output unit, a first sensing output line, and a sensing signal processor. The sensing units are arranged in a matrix and generate a detection signal according to user contact. The first sensing signal lines transfer the detection signal of the sensing unit arranged in a first direction. The second sensing signal lines transfer the detection signal of the sensing units arranged in a second direction that is perpendicular to the first direction. The first output unit sequentially outputs the detection signals of the first sensing signal lines. The first sensing output line extends in the second direction for transferring the detection signal of the first output unit. The sensing signal processor determines whether contact is made or not by processing the detection signals of the first sensing signal lines and the second sensing signal lines. The non-display area of the liquid crystal panel assembly can be reduced by sequentially outputting the sensing data signals of the row and column sensing signal lines through the small amount of wiring. Therefore, an IC can be reduced in size.

22 Claims, 9 Drawing Sheets

FOREIGN PATENT DOCUMENTS

| | | |
|---|---|---|
| JP | 2001-042296 | 2/2001 |
| JP | 2001-075732 | 3/2001 |
| JP | 2002-041244 | 2/2002 |
| JP | 2003-241898 | 8/2003 |
| JP | 2003-296025 | 10/2003 |
| KR | 1020040043903 | 5/2004 |
| KR | 1020040057755 | 7/2004 |
| KR | 10-2005-0030620 | 3/2005 |
| KR | 1020050038987 | 4/2005 |
| KR | 1020050042917 | 5/2005 |

* cited by examiner

DISPLAY DEVICE INCLUDING INTEGRATED TOUCH SENSORS

CROSS-REFERENCE TO RELATED APPLICATION

This application claims priority, under 35 USC §119, of Korean Patent Application No. 10-2007-0020983 filed in the Korean Intellectual Property Office on Mar. 2, 2007, the entire contents of which are incorporated herein by reference.

BACKGROUND OF THE INVENTION

1. Field of the Invention

The present invention relates to a flat panel display, and more particularly, to a liquid crystal display including a touch sensitive touch screen.

2. Description of the Related Art

Just as the demand for flat panel displays has surpassed the demand for cathode ray tube (CRT) displays, the growing demand for thinner and lighter personal computers and television sets increases the need for thinner and lighter display devices.

The flat panel displays include liquid crystal displays (LCD), field emission displays (FED), organic light emitting displays (OLED), and plasma display panels (PDP), among other types.

In general, an active matrix type of flat panel display includes a plurality of pixels arranged in a matrix and displays an image by controlling the light emitting strength of each pixel according to given luminance data. A liquid crystal display includes two display panels one having pixel electrodes and one having a common electrode, and a liquid crystal layer interposed between the two display panels having dielectric anisotropy. In order to display an image, the liquid crystal display applies an electric fields across the liquid crystal layer within each pixel and controls the transmittance of light passing through the liquid crystal layer by controlling the strength of the electric field in each pixel.

FIG. 1 is a block diagram of a liquid crystal display having pixels. FIG. 2 is an equivalent circuit diagram illustrating one pixel of the liquid crystal display of FIG. 1.

As shown in FIG. 1, a liquid crystal display includes a liquid crystal panel assembly 300, gate and data drivers 400 and 500 and a sensing signal processor 700, which are connected to the liquid crystal panel assembly 300, a gray voltage generator 800 connected to the data driver 500, and a signal controller 600 for controlling the elements 300, 400, 500, and 800.

A display operation of a liquid crystal display will now be described. The signal controller 600 receives input image signals R, G, and B and an input control signal for displaying of the input image signals from an external graphics controller (not shown). For example, the signal controller 600 receives a vertical synchronization signal Vsync, a horizontal synchronizing signal Hsync, a main clock signal MCLK, and a data enable signal DE.

The signal controller 600 appropriately processes the input image signals R, G, and B to be suitable for an operating condition, and generates a gate control signal CONT1 and a data control signal CONT2.

The data driver 500 converts a digital image signal DAT for one pixel row PX to an analog data voltage according to the data control signal CONTS from the signal controller 600, and applies the analog data voltage to a corresponding data line $D_1$-$D_m$.

The gate driver 400 applies a gate-on voltage Von to the gate lines $G_1$-$G_n$ according to a gate control signal CONT1 from the signal controller 600, and turns ON switching elements Q connected to the gate lines $G_1$-$G_n$. Then, the data voltage applied to the data lines $D_1$-$D_m$ is applied to a corresponding pixel PX through the turned-on switching element Q.

The difference between the data voltage and the common voltage Vcom applied to the pixel PX is shown as a charge voltage of the liquid crystal capacitor Clc (see FIG. 2), a pixel voltage. The arrangement of liquid crystal molecules changes according to the pixel voltage. Accordingly, the polarization of light passing through the liquid crystal layer 3 changes. A polarizer changes the transmittance of light to change the polarization, and the pixel PX displays luminance that represents the gray of an image signal DAT.

By repeating the described operations in units of a 1 horizontal period (or "1H", which is one period of the horizontal synchronizing signal Hsync and the data enable signal DE], the gate-on voltage Von is sequentially applied to all of the gate lines $G_1$-$G_n$ and the data voltage is applied to all pixels PX, thereby displaying images of one frame.

Referring to FIG. 1, the liquid crystal panel assembly 300 includes a plurality of display signal lines $G_1$-$G_n$ and $D_1$-$D_m$, a plurality of pixels PX connected to the display signal lines $G_1$-$G_n$ and $D_1$-$D_m$ and arranged like a matrix.

Referring to FIG. 2, the liquid crystal panel assembly 300 includes a thin film transistor array panel 100, a common electrode panel 200 facing the thin film transistor array panel 100, a liquid crystal layer 3 interposed between the two panels 100 and 200, and a spacer (not shown) that is compressible to a predetermined level for maintaining a predetermined distance between the two display panels 100 and 200.

The display signal lines $G_1$-$G_n$ and $D_1$-$D_m$ include a plurality of gate lines $G_1$-$G_n$ for transferring gate signals and a plurality of data lines $D_1$-$D_m$ for transferring data signals.

The gate lines $G_1$-$G_n$ extend basically in a row direction (horizontally) and run almost parallel to each other. The data lines $D_1$-$D_m$ extend basically in a column direction (vertically) and run almost parallel to each other.

As shown in FIG. 2, each pixel PX, for example a pixel PX connected to the $i^{th}$ (i=1, 2, . . . , n) gate line $G_i$ and the $j^{th}$ (j=1, 2, . . . , m) data line $D_j$, includes a switching element Q connected to the signal lines $G_i$, and $D_j$, and a liquid crystal capacitor Clc and a storage capacitor Cst, which are connected to the switching element Q. The storage capacitor Cst may be omitted if unnecessary.

The switching element Q is a three-terminal element such as a thin film transistor (TFT) that is disposed on the thin film transistor array panel 100. The switching element Q includes a control terminal connected to the gate lines $G_1$-$G_n$, an input terminal connected to the data lines $D_1$-$D_m$, and an output terminal connected to the liquid crystal capacitor Clc and the storage capacitor Cst. The thin film transistor includes amorphous silicon or polysilicon.

The liquid crystal capacitor Clc uses a pixel electrode 191 of the thin film transistor array panel 100 and a common electrode 270 of the common electrode panel 200 as two terminals. The liquid crystal layer 3 between the two electrodes 191 and 270 functions as a dielectric material. The pixel electrode 191 is connected to the switching element Q. The common electrode 270 is formed on a front surface of the common electrode panel 200 and receives a common voltage Vcom. Alternatively, unlike as shown in FIG. 2, the common electrode 270 may be provided on the thin film transistor array panel 100. At least one of the two electrodes 191 and 270 may be linear or rod shaped.

An additional signal line (not shown) disposed at the thin film transistor array panel 100 and the pixel electrode 191 overlap each other with an insulator interposed therebetween to obtain the storage capacitor Cst in each pixel that supplements the liquid crystal capacitor Clc, and a predetermined voltage such as the common voltage Vcom is applied to the additional signal line. However, the pixel electrode 191 may overlap a previous gate line with the insulator interposed therebetween to obtain the storage capacitor Cst A touch screen panel is a device, such as a display device, that senses touch, and may be used to control an apparatus such as a computer to perform a desired command. The touch using a finger, a touch pen, or a stylus may be sensed writing text, drawing figures on a screen, or executing a related icon. A liquid crystal display having a touch screen panel can detect whether or not contact is being made on the display by a user using a finger or a touch pen. Also, the liquid crystal display having a touch screen panel can detect the location of the contact and output the location information. The cost of a liquid crystal display, however, increases due to the addition of a touch screen panel. Because of the additional manufacturing process of adhering the touch screen panel to the liquid crystal panel, the yield of a liquid crystal display is reduced, the luminance of the liquid crystal panel is reduced, and the overall thickness of the product increases.

In order to overcome such problems, a technology of embedding sensors in a liquid crystal display, instead of adhering the touch screen panel thereto, has been developed. The sensors determine whether or not contact is being made (e.g., by a user's finger), and detect the contact location by sensing light variation or pressure variation made by the user's finger.

Such sensors are arranged in a row and column direction and output detection signals indicating touch location to an external reader through wires. The reader is typically implemented as an additional IC and connected to the wiring of the display panel through a printed circuit board (PCB).

Typically, the higher the degree of integration a sensor has, the greater the number or wires it has. Therefore, a non-display region occupies a wider area in a display panel. Also, since an integrated circuit (IC) needs the same number of contact bumps (pins) as the number of wires, the size of the IC increases.

Therefore, it is desirable to reduce the number of wires for touch sensors in a liquid crystal display.

SUMMARY OF THE INVENTION

An aspect of the present invention provides a flat panel display device having fewer wires for incorporated touch sensors.

An exemplary embodiment of the present invention provides a display device including a plurality of sensing units, a plurality of first sensing signal lines, a first output unit, a first sensing output line, and a sensing signal processor. The sensing units are arranged in a matrix and generate a detection signal according to physical contact. The first sensing signal lines transfer the detection signal of the sensing unit arranged in a first direction (e.g., horizontal). The second sensing signal lines transfer the detection signal of the sensing units arranged in a second direction that is perpendicular to the first direction (e.g., vertical). The first output unit sequentially outputs the detection signal of the first sensing signal lines. The first sensing output line extends in the second direction for transferring the detection signal of the first output unit. The sensing signal processor determines whether contact is being made or not by processing the detection signals of the first sensing output line and the second sensing signal lines.

The first output unit may include a plurality of switching elements respectively connected to each of the first sensing signal lines for transferring the detection signal to the first sensing output line by being sequentially turned ON.

The display device may further include a display panel including a plurality of sensing units and a plurality of pixels arranged in a matrix, a gate driver for applying a gate signal to the plurality of pixels, and a data driver for applying a data signal to the plurality of pixels. The switching elements may be turned ON/OFF according to the gate signal, or a separate sensing scanning unit for sequentially applying a turn-on voltage to the switching elements. The sensing scanning unit may be operated with a different frequency from that of the gate driver.

The display panel may include a lower substrate having the sensing signal lines, a connecting unit connected to the sensing signal line on the lower substrate, an upper substrate facing the lower substrate, and a common electrode for applying a common voltage on the upper substrate, wherein the display device outputs the common voltage as the detection signal when the common electrode and the connecting unit come into contact according to external pressure (e.g., user contact).

The display device may further include a protrusion between the upper substrate and the common electrode at each sensing unit.

Another embodiment of the present invention provides a display device including a plurality of pixels, a gate driver, a plurality of variable capacitors, a plurality of reference capacitors, a plurality of sensing signal lines, an output unit, a sensing output line, and a sensing signal processor. The pixels have a liquid crystal capacitor, and they display an image according to arrangement of liquid crystal. The variable capacitors have the liquid crystal as a dielectric and change capacitance according to a pressure made by user contact. The reference capacitors are coupled to the variable capacitors in series. The sensing signal lines are connected between the variable capacitors and the reference capacitors, and are arranged in a matrix. The output unit sequentially outputs voltage to the plurality of sensing signal lines, and the sensing output line transfers the output of the output unit. The sensing signal processor sequentially receives a voltage of the sensing signal lines from the sensing output line and determines contact information.

The output unit may include a plurality of switching elements connecting the sensing output lines to the sensing signal lines in a row direction.

The switching elements may be sequentially turned on by the gate signal.

The gate driver may include a first gate driving circuit for applying the gate signal to odd-numbered switching elements, and a second gate driving circuit for applying the gate signal to even-numbered switching elements. The sensing output line may include first and second signal lines, odd-numbered switching elements output the sensing signal to the first output signal lines by the gate signal from the first gate driving circuit, and even-numbered switching elements output the detection signal to the first output signal lines by the gate signal from the second gate driving circuit.

The display device may further include a sensing scanning unit operated with a different frequency to that of the gate driver, and sequentially applies a turn-on voltage to the switching elements.

Another aspect of the invention provides a display device, comprising: a first substrate including a plurality of touch sensing electrodes; a second substrate, wherein a dielectric material separates the first substrate from the second substrate; and a common electrode having a common voltage on the second substrate. A sensing signal processor determines whether an external force is being applied to the display device by detecting the common voltage at one or more of the touch sensing electrodes.

The present invention will be described more fully hereinafter with reference to the accompanying drawings, in which exemplary embodiments of the invention are shown.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

DETAILED DESCRIPTION OF THE EXEMPLARY EMBODIMENTS OF THE INVENTION

Figure 3:
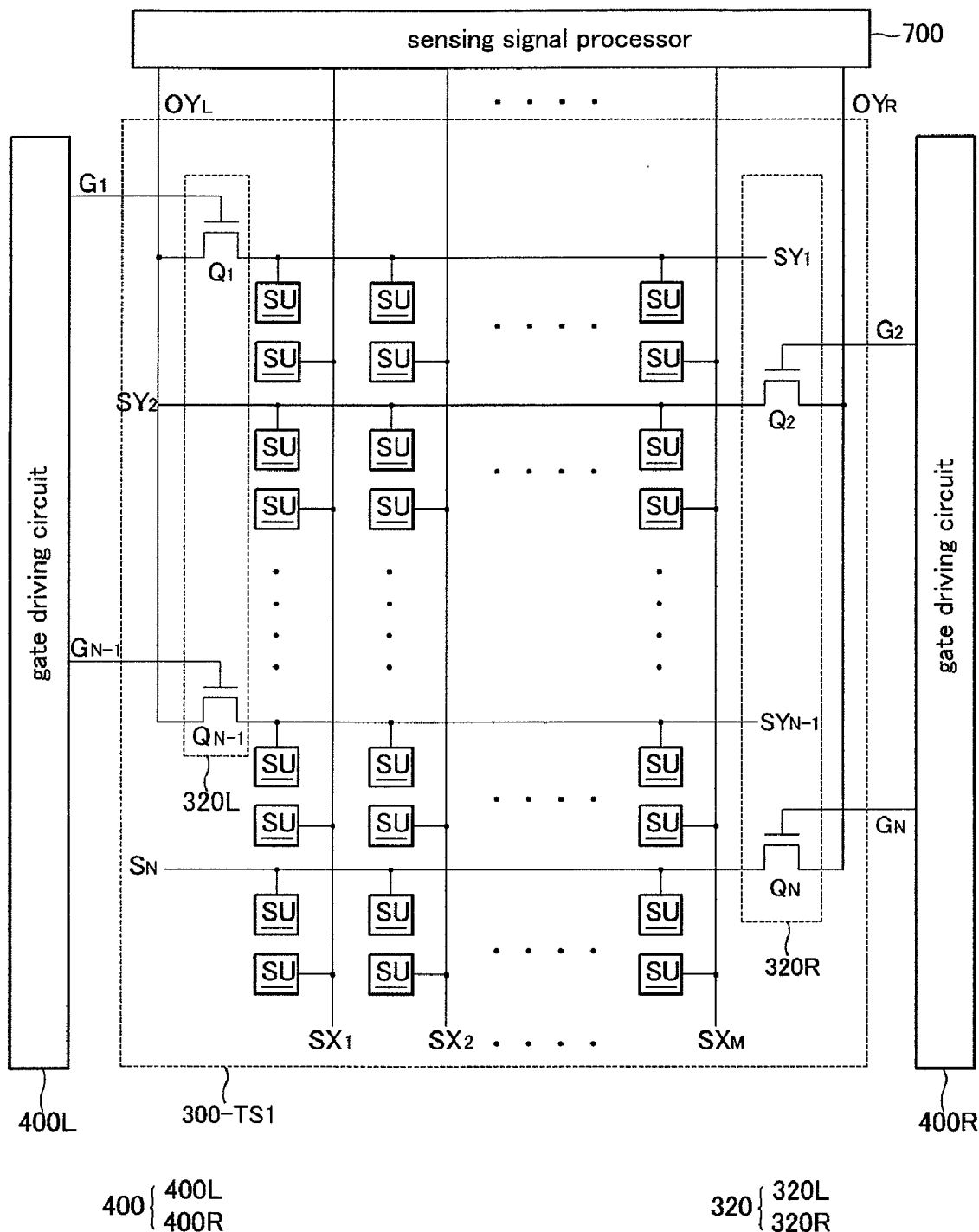
FIG. 3 is a block diagram of a liquid crystal display having sensors according to the first exemplary embodiment of the present invention.
Figure 4:
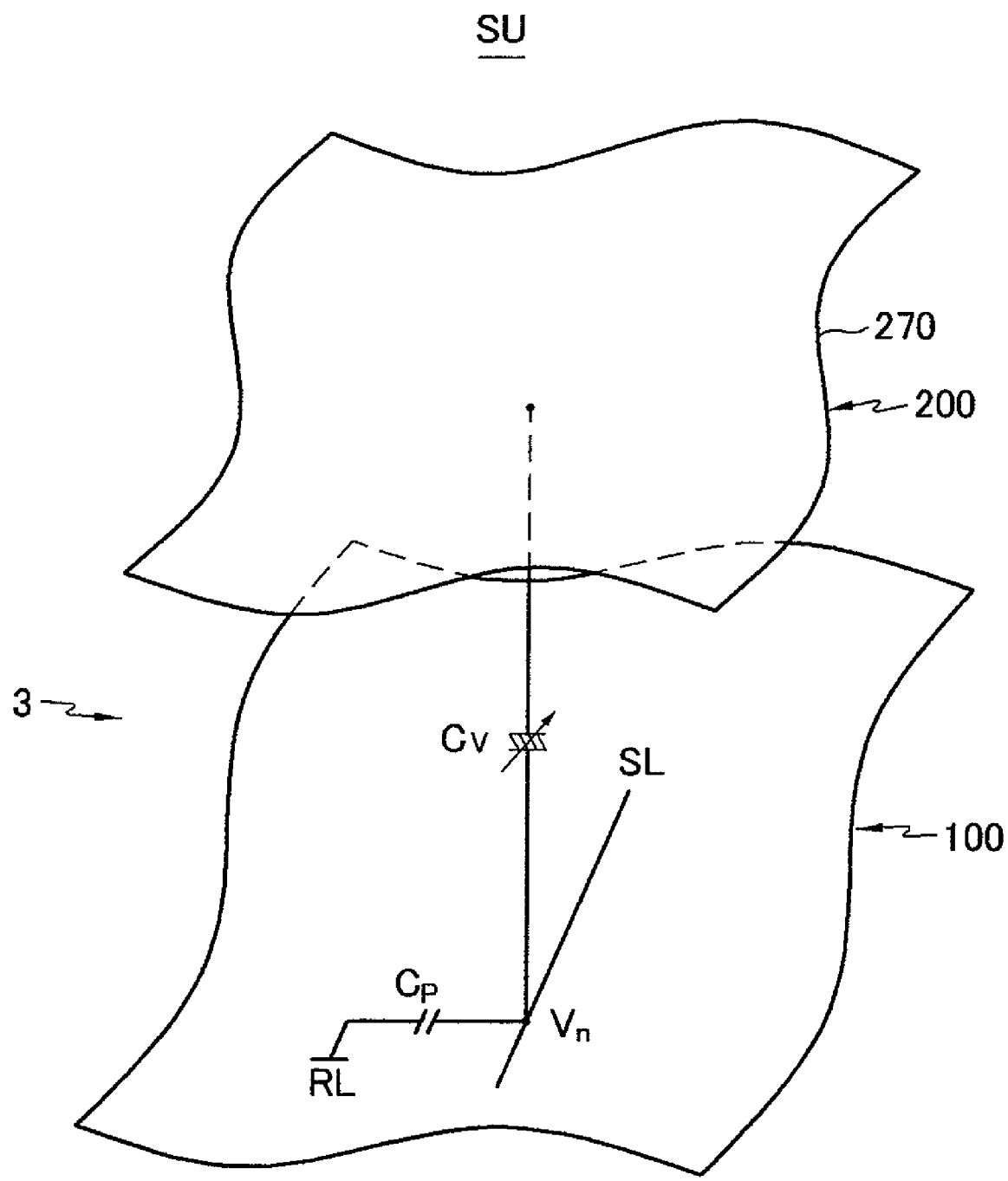
FIG. 4 is an equivalent circuit diagram of the sensor SU shown in FIG. 3.

FIG. 3 is a block diagram of a liquid crystal display having sensors according to the first exemplary embodiment of the present invention. FIG. 4 is an equivalent circuit diagram of the sensor of FIG. 3. The liquid crystal display of FIG. 3 is a modification or improvement of the liquid crystal display of FIG. 1 in the respect that the liquid crystal display in FIG. 3 has all the prior art features of the liquid crystal display of FIG. 1 but additionally includes features related to touch screen functions according to an embodiment of the invention. A detailed description of the prior art components (a gray voltage generator 800, data driver 500, and a signal controller 600, display signal lines $G_1$-$G_n$ and $D_1$-$D_m$) already described in the background section herein and common to both FIG. 1 and FIG. 3 would be redundant and is omitted and may not be shown in FIG. 3.

Figure 1:
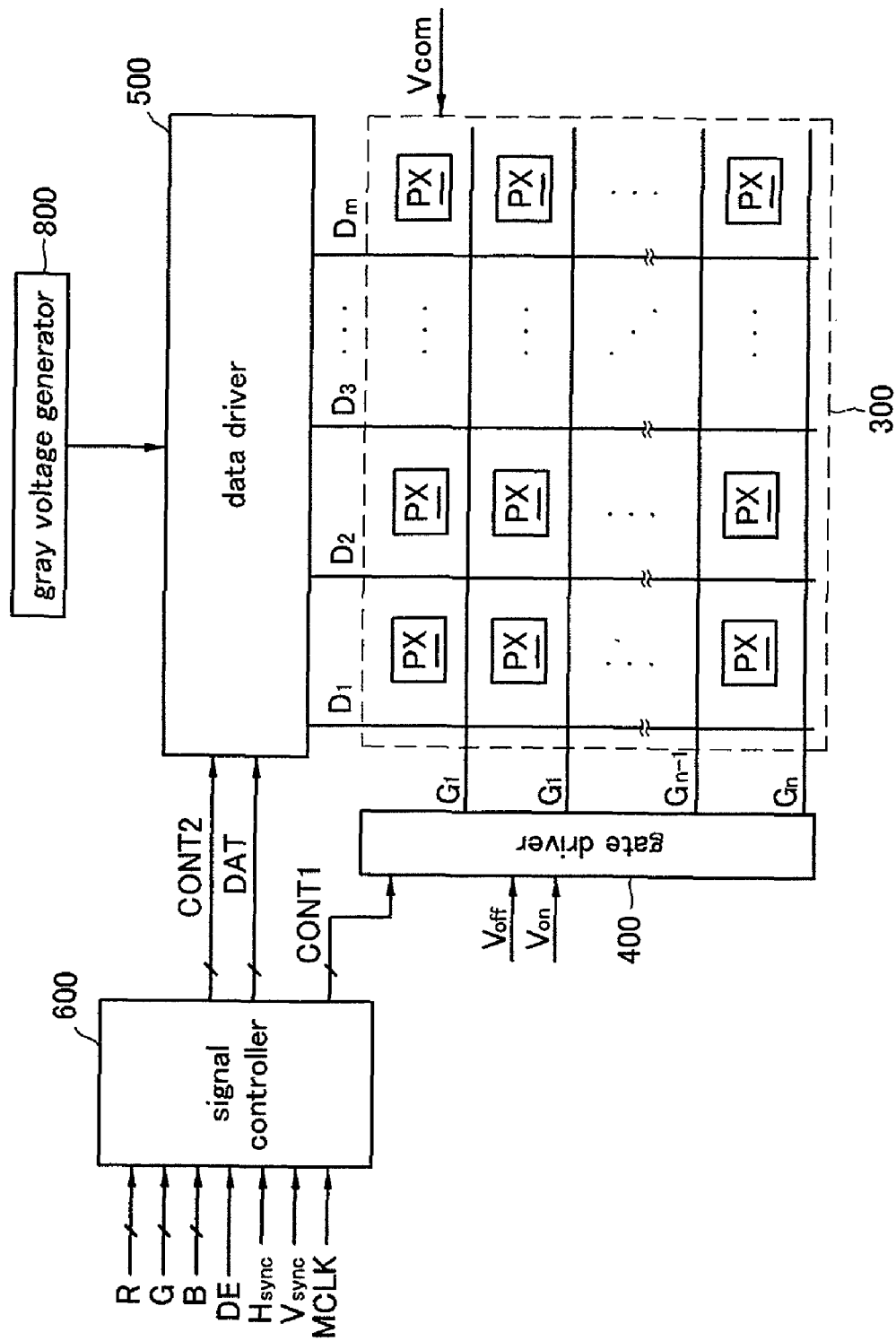
FIG. 1 is a block diagram of a liquid crystal display having pixels according to a first embodiment of the present invention.

As shown in FIG. 3, a liquid crystal display according to an exemplary embodiment of the present invention includes a liquid crystal panel assembly 300, gate drivers 400 (400L, 400R) and data drivers 500 (not shown, see FIG. 1) and a sensing signal processor 700, which are connected to the liquid crystal panel assembly 300 (300-TS1), a gray voltage generator 800 (not shown, see FIG. 1) connected to the data driver 500 (not shown, see FIG. 1), and a signal controller 600 (not shown, see FIG. 1).

Referring to FIG. 1 and FIG. 3, the liquid crystal panel assembly 300 (300-TS1) shown in FIG. 3 includes a plurality of display signal lines $G_1$-$G_n$ and $D_1$-$D_m$, a plurality of pixels PX connected to the display signal lines $G_1$-$G_n$ and $D_1$-$D_m$ and arranged as a matrix, a plurality of sensing signal lines $SY_1$-$SY_N$, $SX_1$-$SX_M$, and RL, and a plurality of sensing units connected to the sensor signal lines and arranged in a matrix, an output unit 320 connected to both ends of row sensing signal lines $SY_1$-$SY_N$, and output signal lines $OY_L$, and $OY_R$ connected to the output unit 320.

FIG. 4 is an equivalent circuit diagram of the sensor SU shown in FIG. 3. The sensing units SU are disposed between two adjacent pixels PX.

Referring to FIG. 3 and FIG. 4, the sensing signal lines $SY_1$-$SY_N$, $SX_1$-$SX_M$, and RL include a plurality of row sensing signal lines $SY_1$-$SY_N$ and column sensing signal lines $SX_1$-$SX_M$ for transferring sensing data signals, and a plurality of reference voltage lines RL for transferring a reference voltage that has a predetermined high level or low level and swings to the high level or to the low level at regular intervals. The reference voltage lines RL may be omitted if necessary.

The gate lines $G_1$-$G_n$ and the row sensing signal lines $SY_1$-$SY_N$ extend basically in a row direction (horizontally) and run almost parallel to each other. The data lines $D_1$-$D_m$ and the column sensing signal lines $SX_1$-$SX_M$ extend basically in a column direction (vertically) and run almost parallel to each other. The reference voltage lines RL may extend in a row or a column direction.

Also, the output signal lines $OY_L$ and $OY_R$ extend basically in a column direction (vertically) and run parallel to the data lines $D_1$-$D_m$ and cross left and right edge regions of the liquid crystal panel assembly 300 (300-TS1), respectively.

As shown in FIG. 4, each sensing unit includes a variable capacitor Cv connected to a row or to a column sensing signal line (hereinafter, a sensing signal line, SL), and a reference capacitor Cp connected between the sensing signal line SL and a reference voltage line (RL).

The reference voltage line RL and the sensing signal line SL of the thin film transistor array panel 100 overlap each other with an insulator (not shown) interposed therebetween to constitute the reference capacitor Cp.

The variable capacitor Cv uses the sensing signal line SL of the thin film transistor array panel 100 and the common electrode 270 of the common electrode panel 200 as two terminals, and the variable capacitor Cv operates as a dielectric material. The capacitance of the variable capacitor Cv changes according to external disturbance such as a touch made to the liquid crystal panel assembly 300 (300-TS1) by a user. For example, such external disturbance may be pressure. When pressure is applied to the common electrode panel 200, the spacer is compressed and the distance between two terminals changes. As a result, the capacitance of the variable capacitor Cv changes. When the capacitance changes, a contact point voltage Vn between the reference capacitor Cp and the variable capacitor Cv changes because the contact point voltage Vn depends upon the capacitance Cv. The contact point voltage Vn propagates through the sensing signal line SL as a sensing data signal. Based on the contact point voltage Vn, the sensing unit determines whether contact is being made or not.

The sensing units SU are disposed between two adjacent pixels PX. The density of a pair of sensing units, which are connected to the row and column signal lines $SY_1$-$SY_N$ and $SX_1$-$SX_M$ and closely disposed at regions where the row and column signal lines cross each other, may be identical to the density of the pixels PX. Alternatively, the density of the sensing unit pair may be less, (e.g., about ¼) Of the dot density. As an example, each dot includes three pixels PX displaying the three primary colors such as red, green, and blue, respectively. The dot is a basic unit representing a resolution of a liquid crystal display. However, each dot may be formed of four or more pixels PX wherein each of the pixels PX may display one of three primary colors and white, or one color (e.g., green) is displayed by two of the four pixels.

For example, when the density of the pair of sensing units SU is ¼ of the dot density, the row and column resolution of the pair of sensing unit SU is about ½ of the row and column resolution of a liquid crystal display. In this case, some pixel rows and some pixel columns may not have a sensing unit SU.

If the density of the sensing units SU and the dot density are adjusted as described, the liquid crystal display according to the present embodiment can be used for text recognition or for an application requiring high precision. The resolution of the sensing units SU can be raised or lowered as needed.

Since the sensing unit SU and the sensing signal line SL occupy comparatively small areas according to an exemplary embodiment of the present invention, the decrease of the aperture ratio of a pixel PX can be minimized.

Referring to FIG. 3 again, the liquid crystal panel assembly 300 (300-TS1) includes the output unit 320 that sequentially outputs the sensing data signals of a plurality (N) of row sensing signal lines $SY_1$-$SY_N$ to the sensing signal processor 700 through the R output signal lines $OY_L$ and $OY_R$. The output unit 320 includes first and second output circuits 320L and 320R disposed at respective ends of the sensing unit and alternately connected to the row sensing signal lines $SY_1$-$SY_N$.

The first (left) output circuit 320L sequentially outputs the sensing data signal of odd-numbered row sensing signal lines $SY_{2i-1}$, where i=1, 2, 3 . . . , to the output data line $OY_L$. The second (right) output circuit 320R sequentially outputs the sensing data signal of even-numbered row sensing signal lines $SY_{2i}$ to the output signal line $OY_R$.

The first and second output circuits 320L and 320R include a plurality of output transistors $Q_1$-$Q_N$ connecting the row sensing signal lines $SY_1$-$SY_N$ and the output signal lines $OY_L$ and $OY_R$.

Each of the output transistors $Q_1$-$Q_N$ includes a control terminal connected to the respective gate lines $G_1$-$G_n$, an input terminal connected to the row sensing signal lines $SY_1$-$SY_N$, and an output terminal connected to the output signal lines $OY_L$ and $OY_R$.

The output transistor $Q_{2i-1}$ of the first output circuit 320L and the output transistor $Q_{2i}$ of the second output circuit 320R are alternately connected to continuous gate lines $G_1$-$G_n$.

The number (N) of output transistors $Q_1$-$Q_N$ may be equal to or fewer than the number (n) of gate lines $G_1$-$G_n$ according to the density of sensing units. If they are equal in number (N=n), all gate lines $G_1$-$G_n$ are connected to corresponding output transistors $Q_1$-$Q_N$. If the number (N) of output transistors $Q_1$-$Q_N$ is less than the number (n) of gate lines $G_1$-$G_n$, the n gate lines that transfer a gate signal at a predetermined interval are selectively connected to the N output transistors $Q_1$-$Q_N$.

Each of the N output transistors $Q_1$-$Q_N$ may be a thin film transistor and may be formed with a switching element Q.

Referring to FIG. 1 and FIG. 3 again, the gray voltage generator 800 generates two pairs of gray voltage sets or reference gray voltage sets related to controlling light transmittance of each pixel.

The gate driver 400 (400L & 400R) is connected to the gate lines $G_1$-$G_n$ of the liquid crystal display assembly 300 (300-TS1) and sequentially applies a gate signal to the gate lines $G_1$-$G_n$. The gate signal includes combinations of a gate-on voltage Von that turns ON the switching element Q and a gate-off voltage Voff that turns OFF the switching element Q.

The gate driver 400 (400L & 400R) includes a first gate driving circuit 400L connected to odd-numbered gate lines $G_1$-$G_n$ and a second gate driving circuit 400R connected to even-numbered gate lines $G_1$-$G_n$. The first and second gate driving circuits 400L and 400R alternately output a gate-on voltage Von.

The data driver 500 is connected to the data lines $D_1$-$D_m$ of the liquid crystal panel assembly 300 (300-TS1). The data driver 500 selects a gray voltage from the gray voltage generator 800 and applies the selected gray voltage to the data lines $D_1$-$D_m$ as a data signal.

The sensing signal processor 700 is connected to the out data lines $OY_1$-$OY_2$ and the column sensing signal lines $SX_1$-$SX_M$ of the liquid crystal panel assembly 300 (300-TS1). The sensing signal processor 700 receives a sensing data signal, amplifies the received sensing data signal, and generates a digital detection signal based on the amplified sensing data signal.

Hereinafter, the sensing units SU and the sensing signal processor 700 will be described in detail with reference to FIG. 5.

Figure 5:
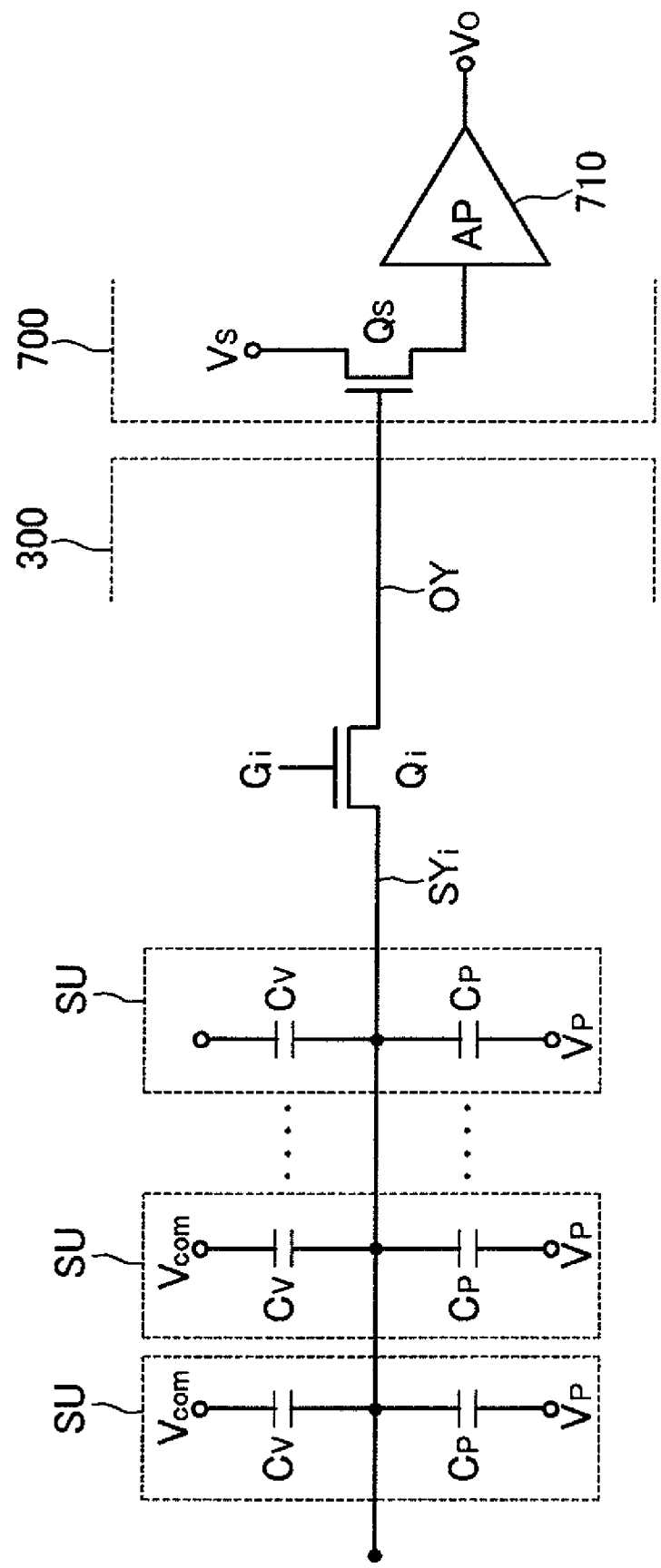
FIG. 5 is an equivalent circuit diagram of a plurality of sensors and a sensor signal processor connected to the thermal sensing signal line of FIG. 3.

FIG. 5 is an equivalent circuit diagram of a plurality of sensors (sensing units SU) and a sensor signal processor connected to row sensing signal lines of FIG. 3.

Referring to FIG. 5, each one of the row sensing signal lines SYi is connected to a plurality of sensing units SU (capacitors Cv) in parallel, and the plurality of sensing units (capacitors Cv) SU may be equivalently expressed as one large sensing unit (capacitor).

The row sensing signal lines SYi are connected to the output signal lines OY, where OY denotes $OY_L$ or $OY_R$, through the output transistor Qi. The output signal line OY is connected to the sensing signal processor 700 through a contact bump (not shown).

The sensing signal processor 700 includes a plurality (M) of amplifying transistors Qs and M amplifiers 710, which are connected to each output signal line OY and the column sensing signal lines $SX_1$-$SX_M$ respectively.

The amplifying transistor Qs is a three terminal element having a control terminal that generates an output signal based on a signal flowing through (e.g., a signal voltage on) the output signal line OY and/or the column sensing signal lines $SX_1$-$SX_M$. The output signal may be an output current. The amplifying transistor Qs may generate a voltage as an output signal.

Each of the plurality (M) of amplifying units 710 has the same structure. Each of the amplifiers 710 may comprise an operational amplifier OP (amplifiers 710) and generates a detection signal Vo by amplifying an output signal from the output transistor Qs.

The sensing signal processor 700 converts an analog detection signal Vo from the amplifying unit 710 into a digital signal using an analog-to-digital converter (not shown).

The liquid crystal display may further include a contact detecting unit (not shown) for receiving the digital detection signal, determining whether contact is made or not, and detecting a contact location through a predetermined calculation. Such a contact detecting unit (not shown) may be embodied as an independent IC, or the signal controller 600 (see FIG. 1) may be adapted to perform the function of the contact detecting unit.

The signal controller 600 (see FIG. 1) may be adapted to control the operation of the gate driver 400, the data driver 500, the gray voltage generator 800, and additionally, the sensing signal processor 700.

Each of the driving devices 400, 500, 600, 700, and 800 may be directly disposed on the liquid crystal panel assembly 300 (300-TS1) in the form of at least one IC chip, or may be disposed on the liquid crystal panel assembly 300 (300-TS1) as a tape carrier packet (TCP) form by being mounted on a flexible printed circuit film (not shown), or may be mounted on an additional printed circuit board (PCB) (not shown). Alternatively, the driving devices 400, 500, 600, 700, and 800 may be integrated at the liquid crystal panel assembly 300 (300-TS1) with the signal lines $G_1$-$G_n$, $D_1$-$D_m$, $SY_1$-$SY_N$, $SX_1$-$SX_M$, $OY_L/OY_R$, and RL and the thin film transistor Q.

Hereinafter, a sensing operation of the liquid crystal display of FIG. 3 will be described in detail.

First, a reading operation of the row sensing signal lines $SY_1$ for reading a sensing data signal will be described.

A common voltage Vcom has a high level and a low level, and swings to the high level and low level every 1H. When the common voltage Vcom has a high level, a reset voltage (not shown) is applied to the row sensing signal lines $SY_j$, thereby initializing the row sensing signal lines $SY_j$. The liquid crystal panel assembly 300 (300-TS1) may further include an additional transistor for transferring the reset voltage (not shown) to initialize the row sensing signal lines $SY_j$, and directly receives a reset voltage (not shown) from the signal controller 600.

If the capacitance of the variable capacitor Cv changes because of the contact made to the sensing unit SU after the row sensing signal lines $SY_j$ are initialized, the voltage of a row sensing signal line $SY_j$ changes.

During 1H after the row sensing signal lines $SY_j$ are initialized, the output transistor $Q_j$ is turned ON by receiving the gate-on voltage Von so as to connect the row sensing signal lines $SY_j$ and the output signal line OY. The voltage variation of the column sensing signal line $SY_j$ is transferred to the output signal line OY through the output transistor $Q_j$ that is turned ON by the data signal. The sensing data signal of the output signal line OY is applied to the control terminal of the amplifying transistor Qs, and the amplitude of the current flowing through the amplifying transistor Qs changes according to the sensing data signal.

The amplifier 710 generates a detection signal Vo by amplifying the output current of the amplifying transistor Qs, and the sensing signal processor 700 reads the detection signal Vo. It is preferable that the sensing signal processor reads the detection signal Vo before the common voltage Vcom transits back to a high level. This is because the detection signal Vo also changes according to the level variation of the common voltage Vcom.

The sensing signal processor 700 converts each analog detection signal Vo to a digital detection signal.

Each of the row sensing signal lines $SY_1$-$SY_N$ is initialized before the gate-on voltage Von is applied, and the output transistors $Q_1$-$Q_N$ are sequentially turned ON by the gate-on voltage Von, thereby sequentially connecting the row sensing signal lines $SY_1$-$SY_N$ and the output signal line OY for 1H.

The sensing signal processor 700 continuously receives the N sensing data signals of N row sensing signal lines $SY_1$-$SY_N$ through two output signal lines $OY_L$ and $OY_R$ while the output transistors $Q_1$-$Q_M$ are sequentially turned ON according to the gate-on voltage Von. Two amplifying transistors Qs and amplifiers 710 connected to the output signal line OY alternatively receive a sensing data signal and generate a detection signal Vo based on the received sensing data signal.

Now, an operation of reading a sensing data signal of column sensing signal lines $SX_1$-$SX_M$ will be described. The sensing signal processor 700 includes as many (M) amplifying transistors Qs and amplifiers 710 as the number of column sensing signal lines $SX_1$-$SX_M$. The amplifying transistors Qs and the amplifiers 710 read a sensing data signal and generate a detection signal Vo before the level of a common voltage Vcom changes after the column sensing signal lines $SX_1$-$SX_M$ are initialized.

In a sensing operation during one frame, a plurality of amplifying transistors Qs and amplifiers 710 of the column sensing signal lines $SX_1$-$SX_M$ generate a detection signal Vo while the amplifying transistors Qs and the amplifiers 710 of one output signal line OY sequentially receive the sensing data signal of each row sensing signal line $SY_1$-$SY_N$ and generate a detection signal Vo.

As described above, by outputting the sensing data signals of a plurality of row sensing signal lines $SY_1$-$SY_N$ to the sensing signal processor 700 through fewer output signal lines OY, the non-display regions of the liquid crystal panel assembly 300 (300-TS1) can be reduced. Also, the number of amplifying transistors Qs and amplifiers 710 of the sensing signal processor 700 can be reduced. Accordingly, an IC can be significantly reduced in size because the number of input ends of an IC having the sensing signal processor 700, thus, the number of conductive bumps (not shown) can be reduced.

The contact detecting unit (not shown) receives a digital detection signal during one frame from the sensing signal processor 700, determines whether contact is made or not, detects a contact location by performing an appropriate calculation operation, and transmits the contact location to an external device. Then, the external device transmits an image signal R, G, and B to the liquid crystal display based on the contact location so as to display a button highlighting, a predetermined screen, or menu selected by a user.

Further, the sensing operation and the image display operation may be performed at different times, and the touch sensing operation can be performed with a different frequency from that used in the gate driver 400.

Hereinafter, a liquid crystal display performing a touch sensing operation independently of an image display operation will be described with reference to FIG. 6.

Figure 6:
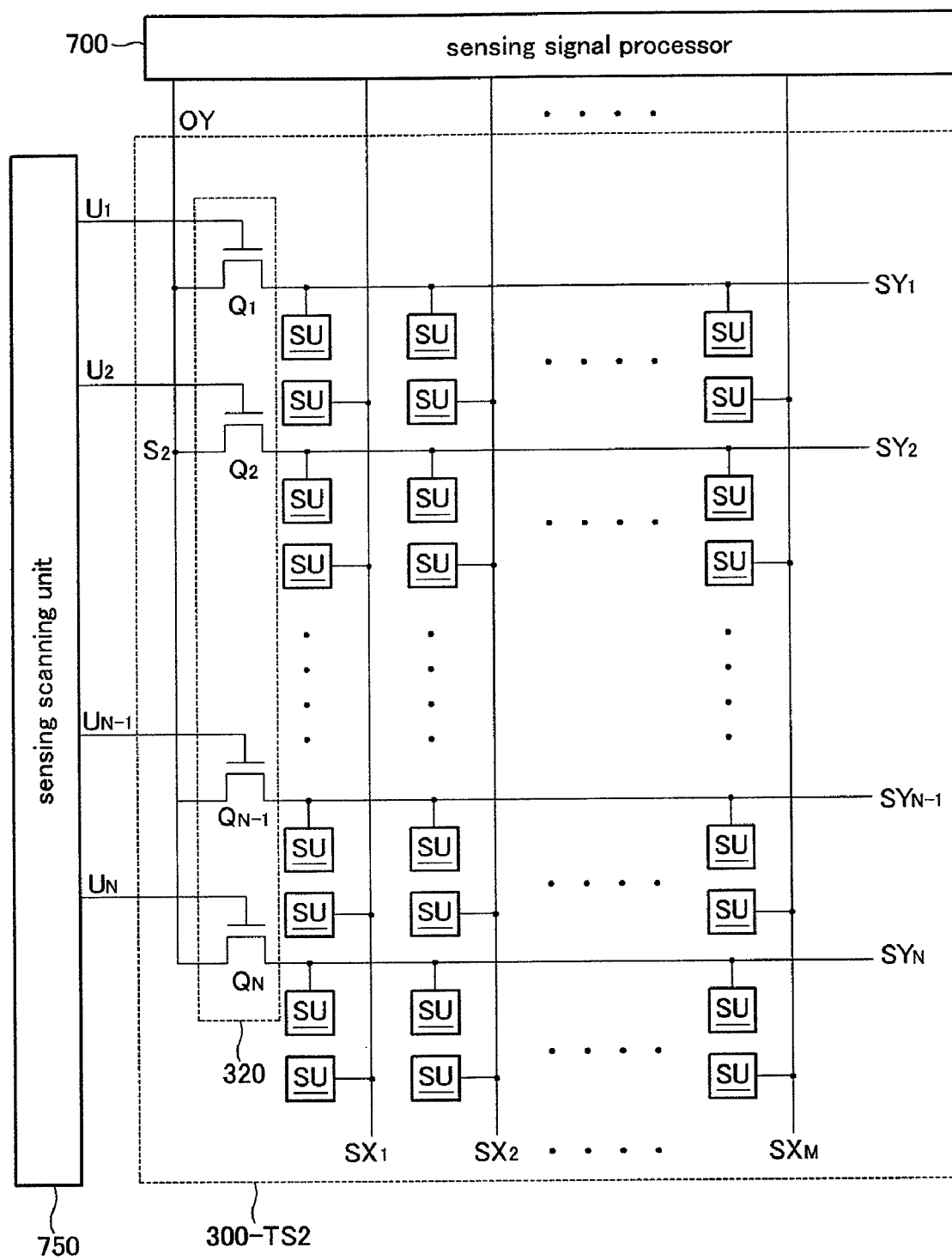
FIG. 6 is a block diagram of a liquid crystal display having sensors according to the second exemplary embodiment of the present invention.

Referring to FIG. 1 and FIG. 6, the liquid crystal display according to the second exemplary embodiment of the present invention, similarly to that shown in FIG. 3, includes a liquid crystal panel assembly 300 (300-TS2), gate and data drivers 400 and 500 and a sensing signal processor 700 that are connected to the liquid crystal panel assembly 300 (300-TS2), a gray voltage generator 550 connected to the data driver 500, and a signal controller 600 for controlling them. Unlike the first exemplary embodiment shown in FIG. 3, the liquid crystal display according to the second exemplary embodiment further includes a sensing scanning unit 750.

The sensing scanning unit 750 may be formed on the liquid crystal panel assembly 300 (300-TS2) with a switching element Q, and sequentially outputs a turn-on voltage to a plurality of sensing scanning lines $U_1$-$U_N$.

The liquid crystal panel assembly 300 (300-TS2) includes an output signal line OY and an output unit 320 disposed at an edge region of one side thereof for connecting all N rows of sensing signal lines $SY_1$-$SY_N$ to the output signal line OY. The output unit 320 includes a plurality (N) of output transistors $Q_1$-$Q_N$.

Each of the N output transistors $Q_1$-$Q_N$ has a control terminal connected to a corresponding one of the N sensing scanning lines $U_1$-$U_N$. The N output transistors $Q_1$-$Q_N$ are sequentially turned ON in response to a turn-on voltage of the N sensing scanning lines $U_1$-$U_N$ and transfer the sensing data signal of each row sensing signal line $SY_1$-$SY_N$ to the output signal line OY.

Since the sensing signal processor 700 according to the second exemplary embodiment is connected to one output signal line OY, sensing data signals from all of the plurality (N) of row sensing signal lines $SY_1$-$SY_N$ are sequentially read through one amplifying transistor Qs and one amplifier 710 and converted to a detection signal Vo.

The sensing scanning unit 750 may be operated using a different frequency from that used in the gate driver 400. Accordingly, the sensing operation and an image display operation may be performed at different times or different frequencies.

Thus, the sensing operation may be performed once every frame in a "porch period" between frames. Particularly, the sensing operation may be performed in a front porch period preceding a vertical synchronization signal Vsync. Since the sensing data signal is less influenced by driving signals of the gate driver 400 and the data driver 500 during the porch period, the reliability of the sensing data signal becomes enhanced. Also, it is not necessary to perform the sensing operation every frame. The sensing operation may be performed once during a plurality of frames if necessary. Furthermore, more than two reading operations may be performed within a porch period, and at least one reading operation may be performed in a frame of a porch period.

Hereinafter, a liquid crystal display having not only N row sensing signal lines $SY_1$-$SY_N$ but also M (M is a real number) column sensing signal lines $SX_1$-$SX_M$ that transfer a plurality of sensing data signals to a sensing signal processor 700 through a small number (L) of output signal lines $OX_1$-$OX_I$ will be described.

Figure 7:
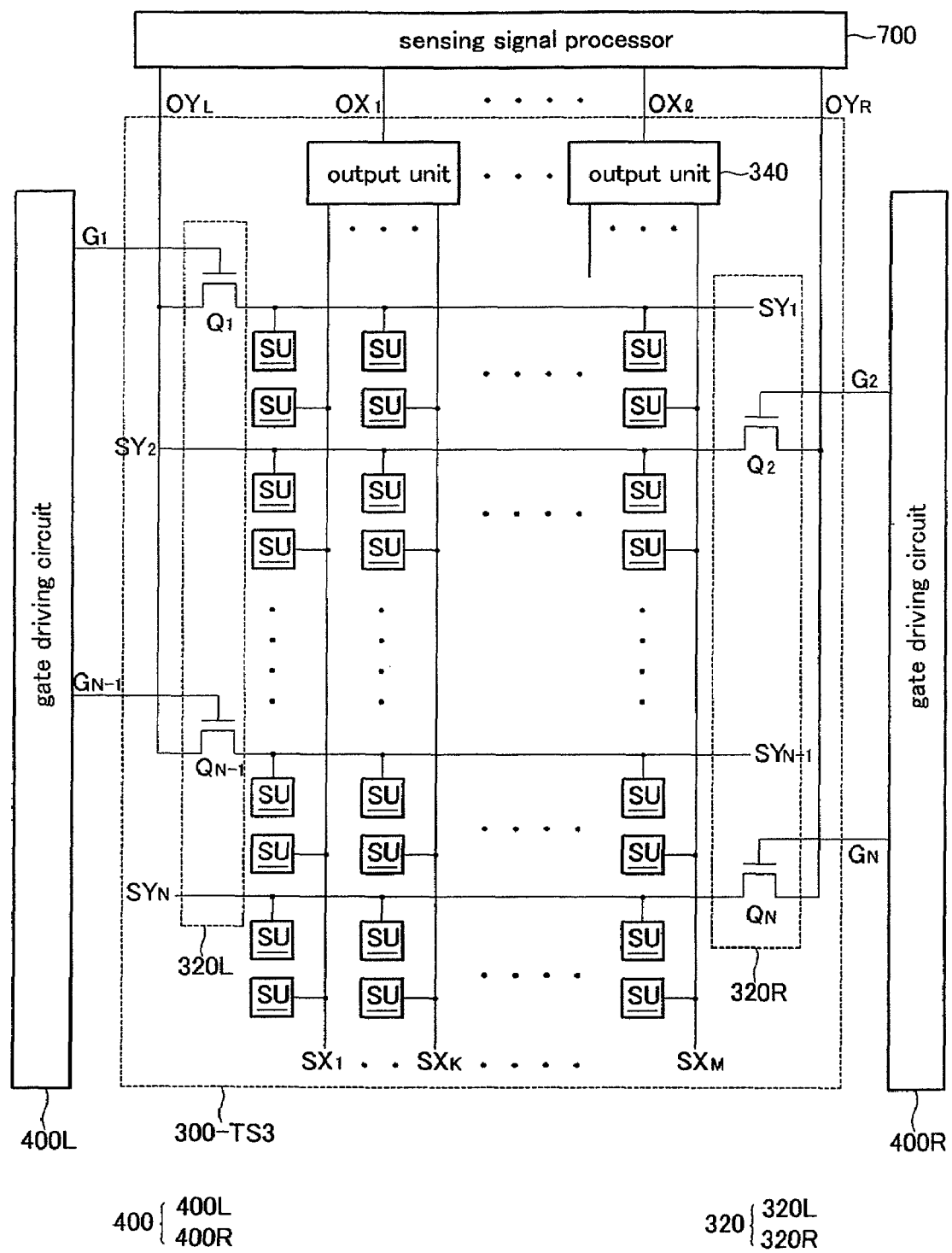
FIG. 7 is a block diagram of a liquid crystal display having sensors according to the third exemplary embodiment of the present invention.
Figure 8:
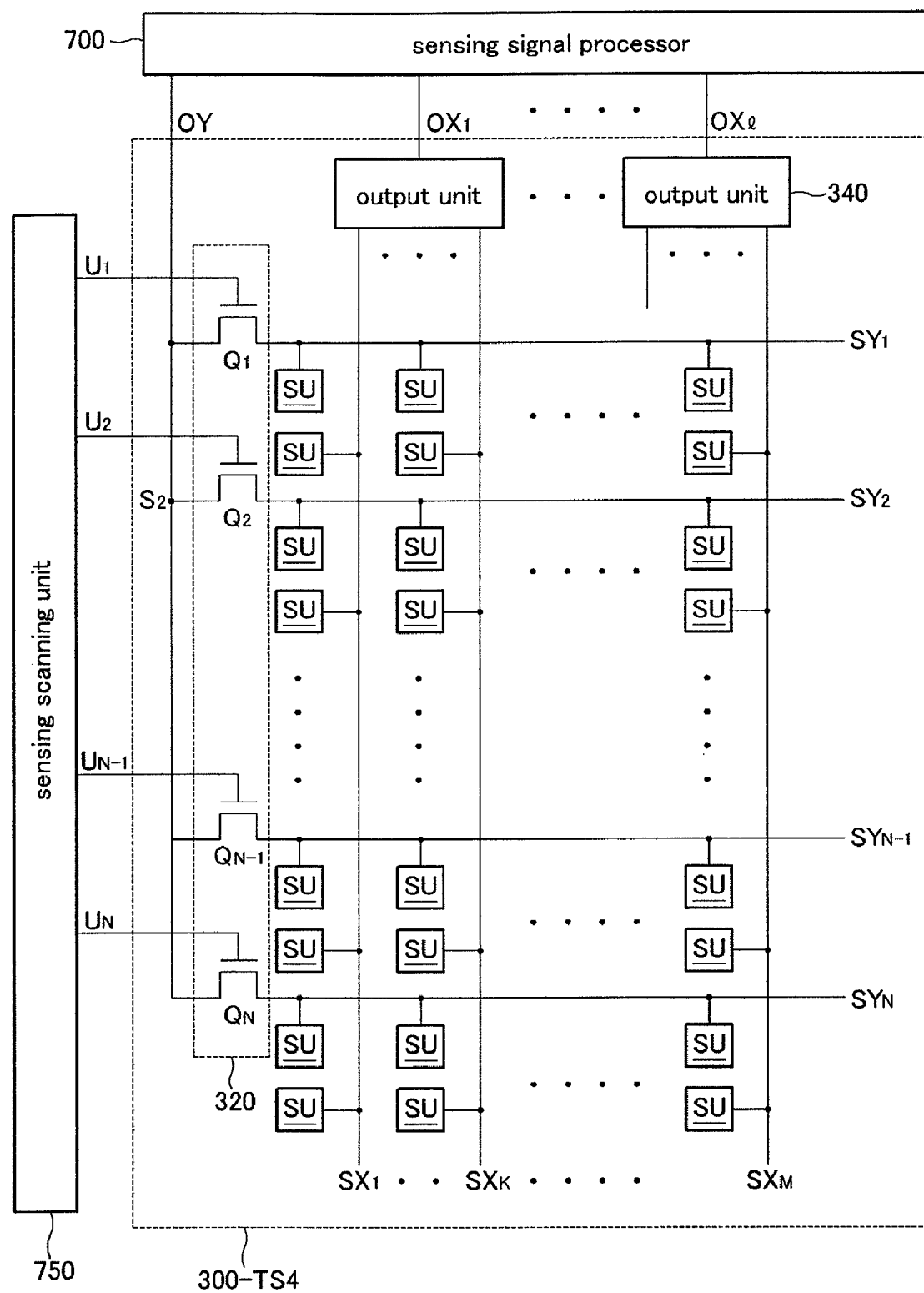
FIG. 8 is a block diagram of a liquid crystal display having sensors according to the fourth exemplary embodiment of the present invention.

FIG. 7 is a block diagram of a liquid crystal display having sensors according to the third exemplary embodiment of the present invention, and FIG. 8 is a block diagram of a liquid crystal display having touch sensors according to the fourth exemplary embodiment of the present invention.

In FIG. 7, like the liquid crystal display of FIG. 3, two output circuits (320) 320L and 320R of the liquid crystal display of FIG. 7 apply sensing data signals of row sensing signal lines $SY_1$-$SY_N$ to the sensing signal processor 700 through two output signal lines $OY_L$ and $OY_R$ by synchronizing with scanning a gate-on voltage Von.

In FIG. 8, meanwhile, like the liquid crystal display of FIG. 6, a single output unit 320 in the liquid crystal display of FIG. 8 applies sensing data signals of N row sensing signal lines $SY_1$-$SY_N$ to a sensing signal processor 700 through one output signal line OY through synchronizing with a scanning turn-on voltage of a sensing scanning unit 750.

The liquid crystal displays of FIG. 7 and FIG. 8 each include a plurality of output units 340 for applying sensing data signals of the M column sensing signal lines $SX_1$-$SX_M$ to the sensing signal processor 700 through fewer (L) output signal lines $OX_1$-$OX_I$ than there are (M) column sensing signal lines $SX_1$-$SX_M$ (i.e., L is less than M, e.g., M=k×L).

Each of the L output units 340 connects a plurality (k) of column sensing signal lines (e.g., $SX_1$-$SX_k$), for example k column sensing signal lines (e.g., $SX_1$-$SX_k$), with one output signal line (e.g., $OX_1$) among the plurality (L) of output signal lines $OX_1$-$OX_I$.

Each of the L output units 340 transfers sensing data signals flowing along k of the column sensing signal lines ($SX_1$-$SX_k$) to one of the L output signal lines $OX_1$-$OX_I$ by sequentially connecting each of the column sensing signal lines $SX_1$-$SX_M$ to the corresponding output signal $OX_1$-$OX_I$ in response to a control signal (not shown).

In order to perform this sequential connection operation, the output unit 340 includes a digital switching circuit such as a multiplexer for selecting one of sensing data signals of the plurality (k) of connected column sensing signal lines $SX_1$-$SX_k$ according to a control signal (not shown) and outputting the one selected.

Meanwhile, the output unit 340 may include a plurality of switching elements (not shown), like the output unit 320.

If the output unit 340 includes a plurality of switching elements (not shown), the switching elements (not shown) are turned ON in a predetermined order according to a control signal (not shown), thereby connecting column sensing signal lines $SX_1$-$SX_M$ and output signal lines $OX_1$-$OX_I$.

The plurality (L) of output units 340 receive the same control signal (not shown) and connect their corresponding set of K column sensing signal lines $SX_1$-$SX_M$ to output signal lines $OX_1$-$OX_I$ in the same order.

The sensing signal processor 700 of FIG. 7 and FIG. 8 includes a plurality (L) of amplifying transistors Qs and amplifiers 710 connected to the L output signal lines $OX_1$-$OX_I$. The amplifying transistors Qs and amplifiers 710 receive sensing data signals and generate each detection signal Vo just like the amplifying transistors Qs and the amplifiers 710 connected to the row sensing signal lines $SY_1$-$SY_N$.

As described above, the detection signal Vo is generated using a lesser number of amplifying transistors Qs and of amplifiers 710 not only for the row sensing signal lines $SY_1$-$SY_M$ but also for the column sensing signal lines $SX_1$-$SX_M$. Therefore, integrated circuits (Ics) implementing the touch sensor circuitry can be reduced in size.

The liquid crystal displays of FIG. 7 and FIG. 8 read N detection signals Vo from N row sensing signal lines $SY_1$-$SY_N$ while reading M detection signals Vo from M column sensing signal lines $SX_1$-$SX_M$ by sequentially applying the gate-on voltage Von or a turn-on voltage of the sensing scanning unit 750.

The detection signals Vo may be generated identically and simultaneously for the row and column sensing data signals. The sensing signal processor 700 generates digital detection signals for the row and column sensing data signals and outputs the generated digital detection signals to a contact detecting unit (not shown).

The liquid crystal display according to the above exemplary embodiments are described as having the sensing unit using a variable capacitor and a reference capacitor as a sensor. However, the present invention is not limited thereto, and a sensor having other structures can be applied to the present invention.

Hereinafter, a sensor according to another exemplary embodiment of the present invention will be described with reference to FIG. 9.

Figure 9:
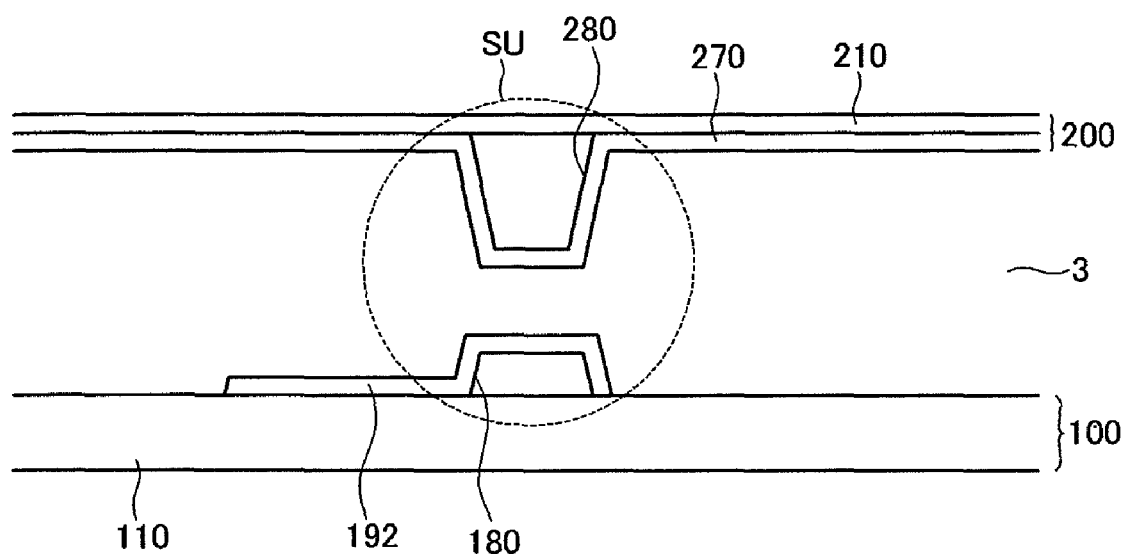
FIG. 9 is a cross-sectional view of a sensor that is different from that of FIG. 4, according to another exemplary embodiment of the present invention.

FIG. 9 is a cross-sectional view of a touch sensor different from that shown in FIG. 4, according to another exemplary embodiment of the present invention.

Referring to FIG. 9, the sensing units SU may be formed in the display panel corresponding each intersection of the row and column sensing signal lines $SY_1$-$SY_N$ and $SX_1$-$SX_M$ as in FIG. 3.

Figure 2:
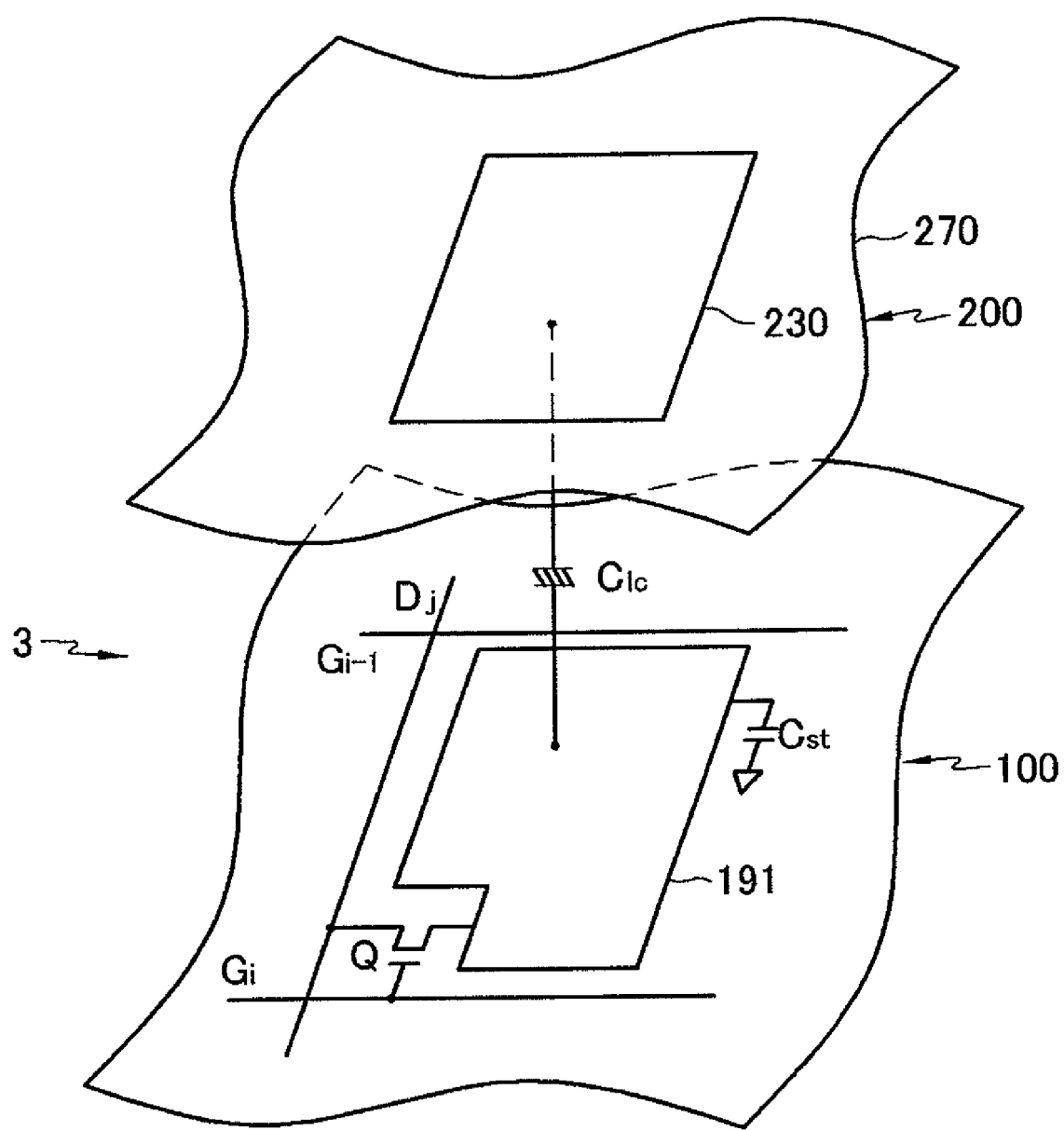
FIG. 2 is an equivalent circuit diagram of one pixel of the liquid crystal display of FIG. 1.

As shown in FIG. 9, a thin film transistor array panel 100 includes a lower substrate 110 having formed thereon a switching element Q of a pixel 191 (see FIG. 1). The lower substrate 110 may include N row sensing signal lines $SY_1$-$SY_N$ formed at the same layer as gate lines $G_1$-$G_n$, and M column sensing signal lines $SX_1$-$SX_M$ formed at the same layer of data lines $D_1$-$D_m$, see FIG. 2.

An insulating layer (not shown) is formed upon the row and column sensing signal lines $SY_1$-$SY_N$ and $SX_1$-$SX_M$ and is exposed through a contact hole (not shown) formed through the insulating layer.

A lower protrusion 180 is formed at a sensing region of each sensing unit upon the insulating layer, and ohmic contacts 192 are formed on the lower protrusion 180. The ohmic contacts 192 are connected to the row and column signal lines $SY_1$-$SY_N$ and $SX_1$-$SX_M$ through the contact hole (not shown).

A second substrate 210 (e.g., supporting a common electrode panel 200) includes an upper protrusion 280 between the upper substrate 210 and a common electrode 270 at the sensing region of each sensing unit. The upper protrusion 280 approaches the lower protrusion 180. A dielectric material, e.g., liquid crystal 3, is disposed between the upper protrusion 280 and the lower protrusion 180 in each at the sensing region of each sensing unit.

Therefore, the upper protrusion 280 and the lower protrusion 180 facing each other form a sensing unit SU, and the ohmic contact protruded by the lower protrusion 180 is variably capacitatively coupled to the common electrode 270 protruded by the upper protrusion 280 according to the variation of the distance between the thin film transistor array panel 100 and the common electrode panel 200. Therefore, the sensing unit SU outputs a common voltage Vcom of the row and column sensing signal lines $SY_1$-$SY_N$ and $SX_1$-$SX_M$ as a detection signal.

A liquid crystal display according to an alternative embodiment of the present invention may use an optical sensor that changes its output signal according to the intensity of light as the touch sensing unit SU. Also, a liquid crystal display according to another alternative embodiment of the present invention can have two types of sensing units.

The display devices in the above described exemplary embodiments of the present invention were liquid crystal displays (LCDs) however, the present invention is not limited thereto. Various alternative embodiments of the present invention can be applied to other flat panel displays including a plasma display device and an organic light emitting device.

According to an aspect of the present invention, the non-display region of the liquid crystal panel assembly including a touch sensor array can be reduced by sequentially outputting the sensing data signals of the row and column sensing signal lines through the small number of wires. Therefore, an IC can be significantly reduced in size.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. An article of manufacture comprising:
   a display panel including a plurality of pixels arranged in a matrix;
   a plurality of gate lines;
   a plurality of data lines;
   a gate driver configured to apply a gate signal to the plurality of pixels via the plurality of gate lines;
   a data driver configured to apply a data signal to the plurality of pixels via the plurality of data lines;
   a plurality of first and second sensing units arranged in a matrix, each sensing unit configured to generate a detection signal according to a physical contact, the plurality of first sensing units being arranged in a first direction, the plurality of second sensing units being arranged in a second direction that is perpendicular to the first direction;
   a plurality of first sensing signal lines, each first sensing signal line configured to transfer the detection signal of one of the first sensing units in the first direction;
   a plurality of second sensing signal lines, each second sensing signal lines configured to transfer the detection signal of one of the second sensing units in the second direction;
   a first output unit including a plurality of switching elements, each of the plurality of switching elements including a control terminal connected to the gate driver via the plurality of gate lines, an input terminal connected to each of the first sensing signal lines, and an output terminal connected to a first sensing output line;
   a sensing signal processor connected to the first sensing output line, and configured to determine whether contact is being made or not by processing the detection signals of the first sensing signal lines and the second sensing signal lines;
   a plurality of second output units each configured to sequentially output detection signals of at least two of the second sensing signal lines; and
   a plurality of second sensing output lines configured to transfer the detection signals from the second output units to the sensing signal processor.

2. The article of claim 1, wherein the first output unit is configured to sequentially output the detection signal of the first sensing signal lines, the first sensing output line extending in the second direction is configured to transfer the detection signal of the first sensing signal lines, and
   the sensing signal processor is configured to determine whether contact is being made or not by processing the detection signals of the first sensing output line and of the second sensing signal lines.

3. The article of claim 2, wherein the plurality of switching elements is configured to be sequentially turned ON and to sequentially transfer the detection signals of the first sensing signal lines to the first sensing output line.

4. The article of claim 3, wherein the gate driver is configured to sequentially apply a turn-on voltage to the switching elements.

5. The article of claim 1, wherein each of the second output units include a multiplexer.

6. The article of claim 1, wherein the switching elements are turned on/off according to the gate signal.

7. The article of claim 1, wherein the gate driver includes:
   a first gate driving circuit for applying the gate signal to odd-numbered pixel lines; and
   a second gate driving circuit for applying the gate signal to even-numbered pixel lines and wherein the plurality of switching elements includes:
   a first switching element group for outputting the detections signal of a first portion of the first sensing signal lines according to the gate signal from the first gate driving circuit;
   a second switching element group for outputting the detection signal of a second portion of the first sensing signal lines according to the gate signal from the second gate driving circuit.

8. The article of claim 1, wherein the first and second output units are formed on the display panel.

9. The article of claim 8, further comprising a protrusion at each of the first and second sensing units between the second substrate and the common electrode.

10. The article of claim 1, wherein the display panel includes:
a first substrate having the sensing signal lines;
a connecting unit, including the first and second sensing signal lines, on the first substrate;
a second substrate facing the first substrate; and
a common electrode for applying a common voltage on the second substrate,
wherein the article outputs the common voltage as the detection signal when the common electrode and the connecting unit come into contact according to an externally applied force.

11. An apparatus comprising:
a plurality of pixels, each pixel having a liquid crystal capacitor, configured to display an image according to the orientation of the liquid crystal in each pixel;
a plurality of gate lines;
a gate driver for applying a gate signal to the pixels via the plurality of gate lines;
a plurality of variable capacitance capacitors arranged in a matrix, each of the variable capacitors configured to change its capacitance according to an externally applied pressure;
a plurality of first and second sensing signal lines, each of the plurality of first and second sensing signal lines being connected to at least one of the variable capacitors;
a first output unit including a plurality of switching elements, each of the plurality of switching elements including a control terminal connected to the gate driver via the plurality of gate lines, an input terminal connected to each of the plurality of first sensing signal lines, and an output terminal connected to a first sensing output line;
a sensing signal processor connected to the first sensing output line, and configured to determine whether physical contact with the apparatus is being made or not by processing the voltage across each the variable capacitors;
a plurality of second output units each configured to sequentially output detection signals of at least two of the second sensing signal lines; and
a plurality of second sensing output lines configured to transfer the detection signals from the second output units to the sensing signal processor.

12. The apparatus of claim 11, wherein the variable capacitance capacitors have liquid crystal as their dielectric.

13. The apparatus of claim 11, further comprising:
a plurality of reference capacitors, each reference capacitor being series connected to a corresponding one of the variable capacitors,
wherein each of the plurality of sensing signal lines is connected to the corresponding one of the reference capacitors.

14. The apparatus of claim 11, wherein the first output unit is configured to sequentially output a voltage of the variable capacitance capacitors to the plurality of sensing signal lines, and
the sensing signal processor is configured to sequentially receive a voltage of the sensing signal lines from the first sensing output line and determining contact information.

15. The apparatus of claim 11, wherein the switching elements are sequentially turned ON by the gate signal.

16. The apparatus of claim 11, wherein the gate driver is formed on the display panel.

17. A display device, comprising:
a first substrate including a plurality of touch sensing electrodes and a plurality of pixels arranged in a matrix, and a plurality of gate lines extended in a direction;
a second substrate, wherein a dielectric material separates the first substrate from the second substrate;
a common electrode having a common voltage on the second substrate;
a gate driver for applying a gate signal to the pixels via the plurality of gate lines;
a plurality of first sensing signal lines, each first sensing signal lines being configured to transfer the common voltage at one or more of at least two of the touch sensing electrodes arranged in a first direction;
a plurality of second sensing signal lines, each second sensing signal line configured to transfer the common voltage at one or more of at least two of the touch sensing electrodes arranged in a second direction, the second direction being perpendicular to the first direction;
a first output unit including a plurality of switching elements, each of the plurality of switching elements including a control terminal connected to the gate driver via the plurality of gate lines, an input terminal connected to each of the first sensing signal lines, and an output terminal connected to a first sensing output line; and
a sensing signal processor connected to the first sensing output line, and configured to determine whether an external force is being applied to the display device by detecting the common voltage at one or more of the touch sensing electrodes;
a plurality of second output units each configured to sequentially output detection signals of at least two of the second sensing signal lines; and
a plurality of second sensing output lines configured to transfer the detection signals from the second output units to the sensing signal processor.

18. The display device of claim 17, wherein the dielectric material is liquid crystal.

19. The display device of claim 17, wherein the display device is a liquid crystal display.

20. The display device of claim 17, wherein the sensing signal processor is configured to determine whether contact is being made or not by processing the common voltage detected on the first sensing signal lines and on the second sensing signal lines.

21. The display device of claim 17, wherein the sensing signal processor determines that contact is being made when the common electrode and at least two of the touch sensing electrodes come into contact according to an externally applied force.

22. The display device of claim 17, further comprising a protrusion at each touch sensing electrode, between each touch sensing electrode on the second substrate and the common electrode.

* * * * *